2,877,083
Patented Mar. 10, 1959

2,877,083
STABILIZATION OF ACYLACETARYLIDE COUPLING COMPONENTS AGAINST FORMALDEHYDE DETERIORATION

Clemens Streck, Loudonville, N. Y., assignor to General Aniline & Film Corporation, New York, N. Y., a corporation of Delaware No Drawing. Application December 26, 1957
Serial No. 705,109

10 Claims. (Cl. 8—44)

This invention relates to the stabilization of coupling components of the acylacetarylide type and more particularly to such stabilization against deterioration by the action of formaldehyde.

Acylacetarylides represent a well known group of compounds useful as coupling components in the production of azo dyestuffs in substance, on a substratum or on the fiber. It is a well known fact that as a group, the acylacetarylides are unstable when exposed to formaldehyde. However, it is often advantageous and even necessary to employ such coupling components in the presence of small amounts of formaldehyde. For example, it may be advantageous to print a textile simultaneouly or subsequently with a Rapidogen (trademark of General Aniline and Film Corporation) paste comprising an acylacetarylide coupling component and a Levamine (trademark of General Aniline and Film Corporation) which is a diazoamino compound, and also with a pigment resin composition of the urea-formaldehyde type followed by drying at elevated temperatures and then treating with acidified steam. During the heat and/or steam treatment, the resin components emit free formaldehyde which tends to cause decomposition of the acylacetarylide. This results in off-shades in the Rapidogen print, which off-shade is readily apparent when the Rapidogen print and the pigment-resin print are adjacent to each other. This is especially apparent in the case of a black print produced from a blue azoic pigment and a yellow azoic pigment comprising an acylacetarylide coupler.

It is an object of this invention to provide a method for stabilizing acylacetarylide coupling components against deterioration by the action of formaldehyde. Another object of this invention is the provision of acylacetarylide compositions stabilized against deterioration by the action of formaldehyde. Other objects and advantages will appear as the description proceeds.

The attainment of the above objects is made possible by the instant invention, which is based upon the discovery that an acylacetarylide devoid of water solubilizing sulfonic and carboxylic acid groups, contained in a Rapidogen composition, when admixed with a member of the group consisting of the o-, and p-phenylphenols and their alkali metal salts, acquires increased resistance against deterioration by the action of formaldehyde. The instant invention accordingly includes the provision of a Rapidogen composition containing an acylacetarylide devoid of sulfonic and carboxylic acid groups and, in an amount sufficient to impart to said acylacetarylide increased resistance against deterioration by the action of formaldehyde, a compound of the group consisting of the o- and p-phenylphenols and their alkali metal salts. The instant invention also includes a process for imparting to an acylacetarylide in a Rapidogen composition, increased resistance against deterioration by the action of formaldehyde by admixture with a sufficient amount of a member of the group consisting of the o- and p-phenylphenols and their alkali metal salts.

The acylacetarylides devoid of sulfonic and carboxylic acid groups which may be stabilized in accordance with the instant invention are well known in the art of azo and azoic chemistry, and in general correspond to compounds having the formula

wherein R represents lower alkyl or aryl; $R^1$ represents an aromatic radical which may be carbocyclic or heterocyclic, X represents —CO—$CH_2$—CO—NH—$R^1$; Y represents —NH—CO—$CH_2$—CO—R; and the sum of $n$ and $m$ is 0 or 1. Specific examples of such acylacetarylides operative herein are:

Acetoacetanilide
Bisacetoacetbenzidide
Bisacetoacet-o-tolidide
Bisacetoacet-o-dianisidide
Acetoacet-4-chloro-2,5-dimethoxyanilide
Benzoylacet-4-benzamido-2,5-dimethoxyanilide
Terephthaloylbisacet-5-chloro-2,4-dimethoxyanilide
Terephthaloylbisacet-4-chloro-5-methyl-o-anisidide
Acetoacet-α-naphthalide
2-acetoacetamino-6-ethoxybenzothiazole
2-acetoacetaminothiophene
5-acetoacetamino-2-phenylpseudoazimidobenzene
5-acetoacetamino-2-phenyl-1,3-benzotriazole
Furoylacetanilide It will be understood that other acylacetarylides not included in the foregoing illustrative list may also be stabilized against formaldehyde in accordance with the instant invention. Thus, acylacetarylides in which $R^1$ in the above formula may represent an anthracene nucleus or a heterocyclic nucleus other than the benzothiazole nucleus in the compound last listed above may also be employed. As examples of such compounds there may be mentioned the acylacetamides of aminonaphtholthiazoles and carbazothiazoles disclosed in German Patents 611,882, and 612,072. It will thus be seen that any compound which contains an acylacetarylide group and which does not contain a solubilizing sulfonic or carboxylic acid group may be stabilized in accordance with the instant invention.

The instant phenylphenol stabilizing compounds are employed in accordance with this invention in Rapidogen compositions containing a Levamine and an approximately equivalent amount of an acylacetarylide coupling component. A Levamine comprises a diazotizable primary amine compound (aromatic, carbocyclic or heterocyclic) which is free from solubilizing sulfonic and carboxylic acid groups, which has been diazotized in known manner as by treatment with nitrous acid, and the resulting diazo compound stabilized against azoic coupling on the alkaline side in known manner by reaction with an organic amine containing at least one solubilizing group and at least one replaceable hydrogen atom attached to an amino nitrogen atom. These stabilized diazo compounds are often referred to as diazoamino, diazoimino and diazoamidine compounds and the like, and generically under the term diazoamino compounds.

The diazotizable primary amine compounds employed in producing the Levamine are almost infinite in number and well known in the art. Included among such compounds are such aromatic and heterocyclic amines as anilines, xenylamines, naphthylamines, benzidines, aminocarbazoles, aminofuranes, aminothiazoles, aminoarylsulfones, aminodiphenyl ethers, aminobenzophenones, aminofluorenones, aminoazo compounds, and the like. As specific examples of some suitable diazo components, there may be mentioned aminoazo toluene, 4-chloro-2-nitroaniline, 5-chloro-o-toluidine, 4-nitro-o-toluidine, 2,5-dichloroaniline, m-chloroaniline, 4-benzoylamino-2,5-diethoxylaniline, 4-nitro-o-anisidine, 4-chloro-o-anisidine, 1-aminonaphthalene, 1-aminoanthraquinone, dianisidine, 5-chloro-4-nitro-o-anisidine, 6-amino-2-methylbenzothiazole, 1-aminocarbazole, aminobenzophenone, aminodiphenylsulfone, 2,6-dichloro-1,4-phenylenediamine, benzidine, 4,4'-diaminostilbene, and the like.

The organic amines employed for stabilizing the diazotized primary amine compounds to produce Levamines are well known in the art and are reacted therewith in proportions sufficient to react with all the diazo groups therein. As representative of such stabilizing organic amines, there may be mentioned by way of example:

Sarcosine
Methyl taurine
4-sulfo-2-aminobenzoic acid, and its N-methyl and N-ethyl derivatives
5-sulfo-2-aminobenzoic acid, and its N-methyl and N-ethyl derivatives
2-amino-3,5-disulfobenzoic acid
1-aminonaphthalene-2,4-disulfonic acid
2-aminonaphthalene-4,6,8-trisulfonic acid
Proline
Pyrrolidine-$\alpha$-sulfonic acid
Glucamine
Methyl glucamine
Guanylurea-N-sulfonic acid
Guanyltaurine
N-nitroguanylurea-N-sulfonic acid
2-biguanidylnaphthalene-1-sulfonic acid, and the like In general, the stabilized diazo compounds (Levamine) employed in the Rapidogen compositions above described are formed by the reaction of the diazo derivative of a strongly basic diazotizable primary amine with a stabilizing amine of weak basicity. Such stabilized compounds do not undergo a coupling reaction in alkaline media in the presence of the coupling component, but in the presence of acidic reagents, they split, permitting coupling of the diazo compound with the acylacetarylide coupling component.

The instant phenylphenol stabilizers may be incorporated into a dry Rapidogen composition comprising only Levamine, acylacetarylide, and an amount (e. g. 0–60% by weight) of inert standardizing agent such as dextrin, sodium sulfate, etc., sufficient to bring the composition to a standard strength, the phenylphenol being in proportions of about 1 to 25% by weight thereof.

Similarly, the stabilizing compound may be incorporated into a printing paste containing Levamine, acylacetarylide, sufficient caustic to solubilize the latter coupling component, water, solvents usually of the alcohol and glycol type, and a thickening agent such as starch tragacanth, the phenylphenol being in proportions of about 0.05 to 5% by weight of the paste.

The instant stabilizing compounds may also be employed in Rapidogen compositions in solution form, which have of late received increased interest, in proportions of about 1 to 10% of the stabilizing compound by weight. These solutions operative in the instant invention ordinarily contain about 1 to 20% of Levamine and an approximately equivalent amount of acylacetarylide coupling component, sufficient caustic to dissolve the coupler, an organic solvent usually of the alcohol or glycol type and water. Such Rapidogen solutions may also contain other substances found useful in formulating Rapidogens in stable solution form.

In general, the phenylphenol stabilizers of the instant invention may be employed in compositions of the type described above in proportions of about 25 to 500% of the weight of the acylacetarylide therein, depending on the particular type of composition.

The following examples in which parts are by weight, unless otherwise indicated, are illustrative of the instant invention and are not to be regarded as limitative:

*Example 1*

The following Rapidogen formulation is compounded:

85 g. Levamine (diazomine) from dianisidine, diazotized and stabilized with methyltaurine
50 g. Naphthol AS (3-hydroxy-2-naphthanilide)
22 g. Naphthol AS–G (bisacetoacet-o-tolidide)
25 g. sodium o-phenylphenolate
30 g. dimethylethanolamine 70% aq. soln.
50 g. diethylene glycol
50 g. Cellosolve (glycol monoethyl ether)
120 g. caustic soda 40° Bé.
525 g. water 20 g. of this Rapidogen formulation is thickened with starch tragacanth to printing thickness. A 10 g. swatch of cotton cloth is printed with this composition, dried, and a black color developed by exposing to acidified steam for 2 min. This is identified as sample 1–A.

To an identical printing composition is added 3 drops of commercial formaldehyde. A 10 g. swatch of cotton cloth is likewise printed with this composition, dried, and exposed to acidified steam for 2 min. This is identified as sample 1–B.

A printing composition is made up as per the above formulation for sample 1–A, only excluding the sodium o-phenylphenolate. 20 g. of this is thickened with starch tragacanth. 3 drops of commercial formaldehyde is added to this paste as in sample 1–B. Cotton is printed, dried, and the color developed by exposure to acidified steam for 2 min. This is identified as sample 1–C.

Sample 1–A is a good jet black, whereas in 1–B and 1–C the shade is changed to a bluer shade of black. However, the change is much less in sample 1–B which contains the sodium o-phenylphenolate than in sample 1–C which does not contain the additive.

Thus the presence of the sodium o-phenylphenolate allows a much greater margin of safety when Rapidogens containing an acetoacetarylide are printed in the presence of formaldehyde.

*Example 2*

The following Rapidogen solution is compounded:

77.8 g. acetoacet-p-phenetidide
90 g. diazomine from 5-chloro-o-anisidine diazotized and stabilized with sarcosine
190 g. Cellosolve
45 g. dimethylethanolamine 70% aq. soln.
21 g. NaOH 100% (added as 40° Bé. soln.)
40 g. urea
473 g. water
25 g. sodium o-phenylphenolate 20 g. of this solution is made into a printing paste employing 10 g. water and 70 g. starch tragacanth.

A 10 g. swatch of cotton is printed with this paste, dried, and a yellow color developed by exposure to acidified steam for 2 min. (sample 2–A).

As in Example 1, two additional prints are made, one identical with sample 2–A, except that three drops commercial formaldehyde are added to the paste (sample 2–B) and the other, in which the sodium o-phenylphenolate is excluded and the formaldehyde included (sample 2–C).

Sample 2–A is a bright yellow. Sample 2–B, the color is affected to a lesser extent than in sample 2–C.

*Example 3*

Rapidogens are frequently sold as dry compositions. The following formulation is compounded:

85 g. Levamine as in Example 1
50 g. Naphthol AS 22 g. Naphthol AS-G
25 g. sodium o-phenylphenolate
18 g. sodium sulfate In order to use, the above formulation is dissolved in 50 g. diethylene glycol, 50 g. Cellosolve, 120 g. caustic soda 40° Bé., and 525 g. water.

20 g. of this paste is thickened and printed as in sample 1-A (sample 3-A).

A second print is made wherein 3 drops commercial formaldehyde is added to the printing paste (sample 3-B).

A third print is made, eliminating the sodium p-phenylphenolate, but including the formaldehyde (sample 3-C).

As in Example 1, sample 3-A is a jet black, sample 3-B and sample 3-C are bluer, but sample 3-C is considerably bluer than sample 3-B.

*Example 4*

Rapidogens are sometimes formulated as ready to use printing pastes. The following formulation illustrates this use:

1.70 g. Levamine as in Example 1
1.00 g. Naphthol AS
.44 g. Naphthol AS-G
3.00 g. caustic soda 40° Bé.
20.00 g. water
1.00 g. sodium o-phenylphenolate
72.86 g. starch tragacanth A print, sample 4-A, is made as in Example 1. A print, sample 4-B, is made after mixing the paste with 3 drops formaldehyde and a print, sample 4-C, is made including the formaldehyde, but excluding the sodium o-phenylphenolate.

Results are commensurate with those of Example 1.

*Example 5*

When the procedure of Example 1 is repeated, but substituting the sodium o-phenylphenolate by sodium p-phenylphenolate, similar results are obtained.

This invention has been disclosed with respect to certain preferred embodiments, and various modifications and variations thereof will become obvious to the person skilled in the art. It is to be understood that such modifications and variations are to be included within the spirit and scope of this application.

I claim:

1. A composition containing a diazotized primary amine compound devoid of solubilizing groups and solubilized and stabilized against azoic coupling on the alkaline side by reaction with an organic amine containing at least one solubilizing group and at least one replaceable hydrogen atom attached to an amino nitrogen atom, an acylacetarylide devoid of sulfonic and carboxylic acid groups, and in an amount sufficient to impart to said acylacetarylide increased resistance against deterioration by the action of formaldehyde, a compound of the group consisting of the o- and p-phenylphenols and their alkali metal salts.

2. A composition as defined in claim 1 wherein said compound is sodium o-phenylphenolate.

3. A composition as defined in claim 1 wherein said compound is sodium p-phenylphenolate.

4. A composition as defined in claim 1 wherein said acylacetarylide is bisacetoacet-o-tolidide.

5. A composition as defined in claim 1 wherein said acylacetarylide is acetoacet-p-phenetidide.

6. A process comprising admixing with a composition containing an acylacetarylide devoid of sulfonic and carboxylic acid groups and a diazotized primary amine compound devoid of solubilizing groups and solubilized and stabilized against azoic coupling on the alkaline side by reaction with an organic amine containing at least one solubilizing group and at least one replaceable hydrogen atom attached to an amino nitrogen atom, a compound of the group consisting of the o- and p-phenylphenols and their alkali metal salts in an amount sufficient to impart to said acylacetarylide increased resistance against deterioration by the action of formaldehyde.

7. A process as defined in claim 6 wherein said compound is sodium o-phenylphenolate.

8. A process as defined in claim 6 wherein said compound is sodium p-phenylphenolate.

9. A process as defined in claim 6 wherein said acylacetarylide is bisacetoacet-o-tolidide.

10. A process as defined in claim 6 wherein said acylacetarylide is acetoacet-p-phenetidide.

No references cited.